Figure 7:
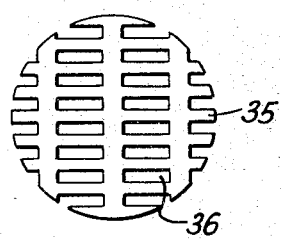

Dec. 15, 1942.	H. WENKER	2,304,867
LIQUID DISCHARGING DEVICE
Filed Dec. 6, 1939	3 Sheets-Sheet 1
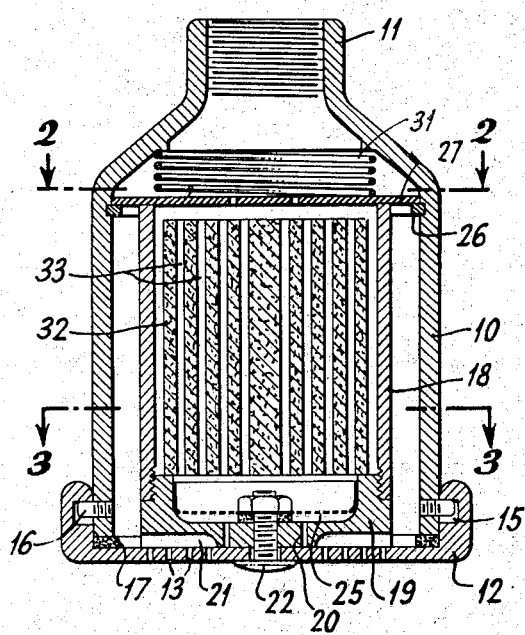
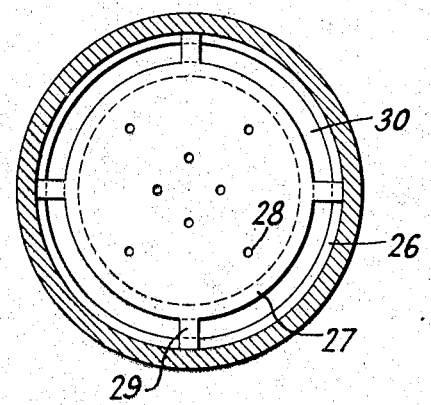
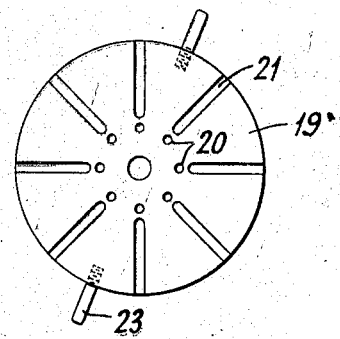
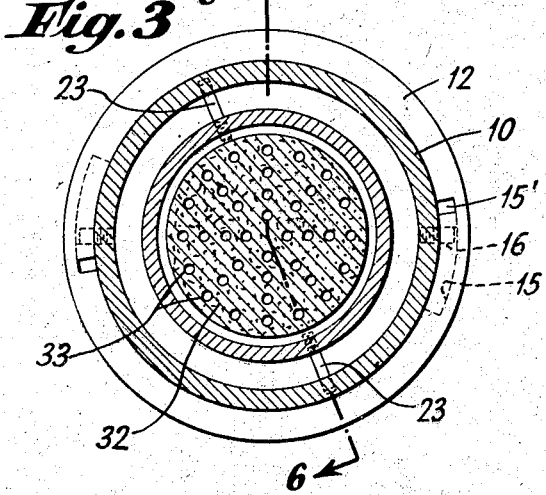
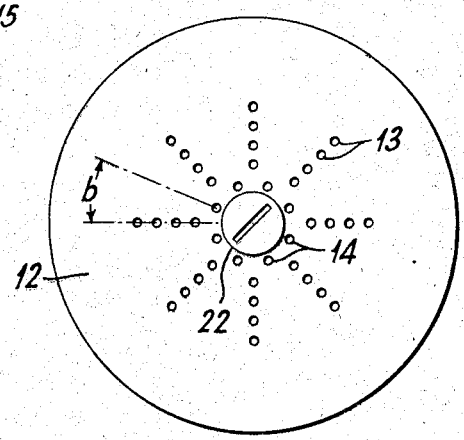
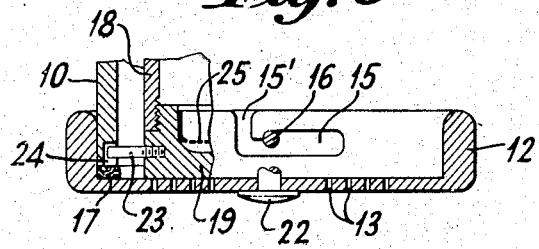
INVENTOR.
HENRY WENKER
BY William A. Zalesak
ATTORNEY.

Dec. 15, 1942.   H. WENKER   2,304,867
LIQUID DISCHARGING DEVICE
Filed Dec. 6, 1939    3 Sheets-Sheet 2

INVENTOR.
HENRY WENKER
BY William A. Zalesak
ATTORNEY.

Dec. 15, 1942.                H. WENKER                 2,304,867
                        LIQUID DISCHARGING DEVICE
                   Filed Dec. 6, 1939        3 Sheets-Sheet 3
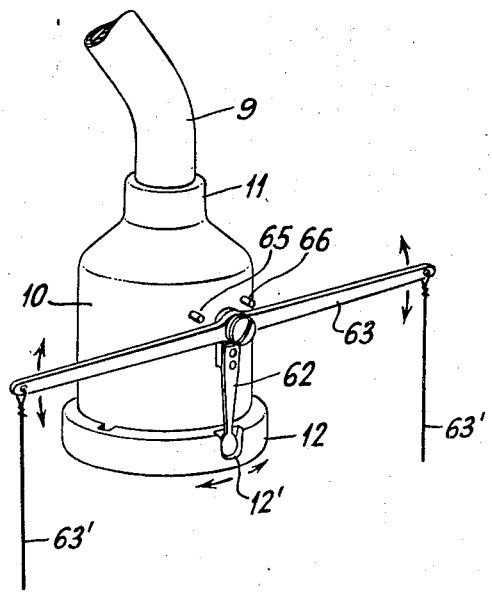
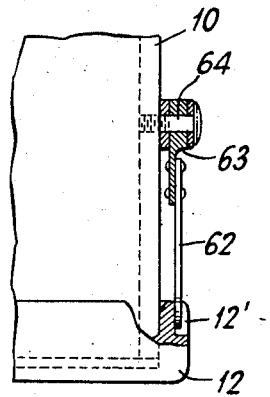
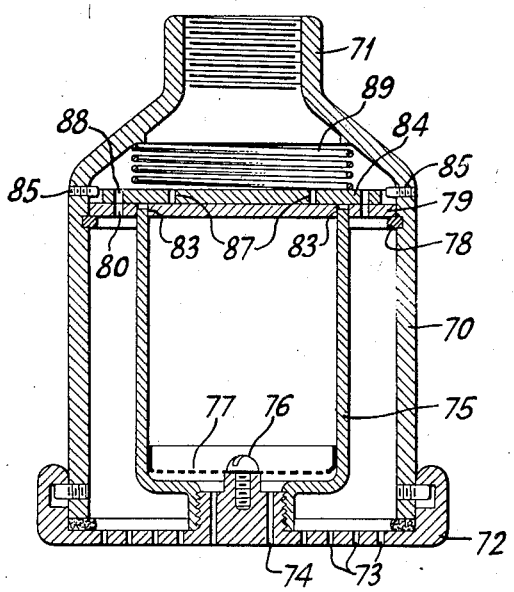
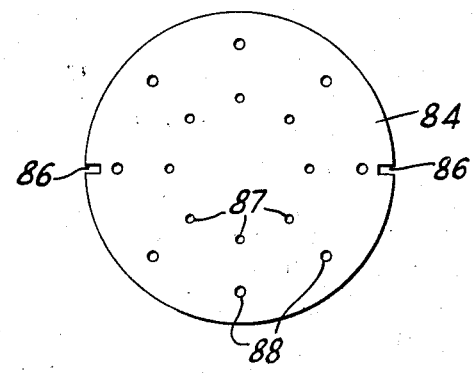
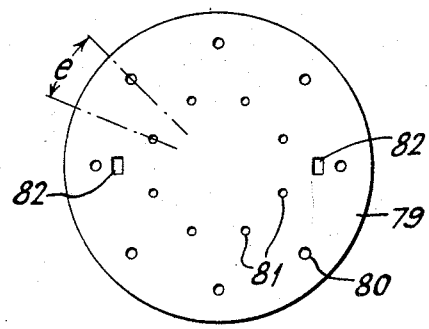
INVENTOR.
HENRY WENKER
BY William A. Zalesak
ATTORNEY.

Patented Dec. 15, 1942

2,304,867

UNITED STATES PATENT OFFICE 2,304,867

LIQUID DISCHARGING DEVICE

Henry Wenker, Elizabeth, N. J.

Application December 6, 1939, Serial No. 307,781

11 Claims. (Cl. 299—83)

My invention relates to discharge devices, more particularly to shower heads or sprays capable of selectively dispensing a plurality of mixtures or a single liquid.

Attempts have been made to provide showers or sprays capable of dispensing liquid mixtures, for example soapy mixtures to be used in shower baths and for other purposes. Present devices lack simplicity of structure and ready means for attachment to the liquid supply to be mixed with the active ingredient or substance and as a rule have no simple means to cut off the flow of the mixture and substitute a flow of the clear liquid. In the usual form of device it is necessary to detach the mixing device or wait until all of the particles of active ingredient have been dissolved and dispensed from the mixing chamber before a flow of clear liquid can be obtained. Simple means are not as a rule available for inserting the active ingredient to be mixed in the mixing chamber. In present devices no simple means are provided for diverting the liquid to be mixed, for example water, from the supply source either to the mixing chamber containing the active ingredient to provide the mixture or to the by-passing means for providing a flow of pure liquid, and do this in such a manner that positive and efficient mixing with the active ingredient can be brought about and the mixture dispensed only in the small quantities actually needed so that undue dilution will not take place. Further, a simple apparatus of the kind described for selectively providing more than one kind of mixture seems to be lacking.

It is, therefore, an object of my invention to provide a simple means for selectively dispensing as a shower or spray a liquid such as water or a mixture of the liquid with some active material, such as soap, bath salts, perfume, hair wash and the like.

It is a further object of my invention to provide such a device which will provide a copious flow of clear liquid such as water when desired, but which also will dispense only the small concentrated quantities of mixed solutions or mixed liquids desired without the mixture being so diluted as to be ineffective.

A further object of my invention is to provide a device which is capable of producing selectively two or more different mixtures in addition to a flow of unmixed liquid.

Another object of my invention is to provide such a device in which the active ingredient may be easily and quickly replenished.

A further object of my invention is to provide a device in which the full pressure of the liquid source can be directed into the mixing chamber against the active material to be mixed with the liquid to provide quickly and efficiently the mixture desired, but which nevertheless permits the diversion of the water completely from the active material to other passages to provide a copious stream of unmixed liquid such as water at any time desired.

It is a further object of my invention to provide the active material in the form of solids having a shape designed to promote an efficient mixing action.

Another object of my invention is to provide a device which insures efficient use of the clear liquid such as water by preventing wasting during the period when the mixture is used, for example during the soaping operation.

A still further object of my invention is to make such a device which is simple and inexpensive and which is easily installed on available fixtures and simply operated.

Briefly the preferred embodiment of my invention comprises a device having two or more discrete chambers provided with separate passageways or apertures through which a liquid medium can flow either in the mixed or unmixed state. The chambers are concentric and the device is provided with means which opens or closes the passages in such manner that selective control of the flow of the various liquids and mixtures can be obtained at will.

Figure 8:
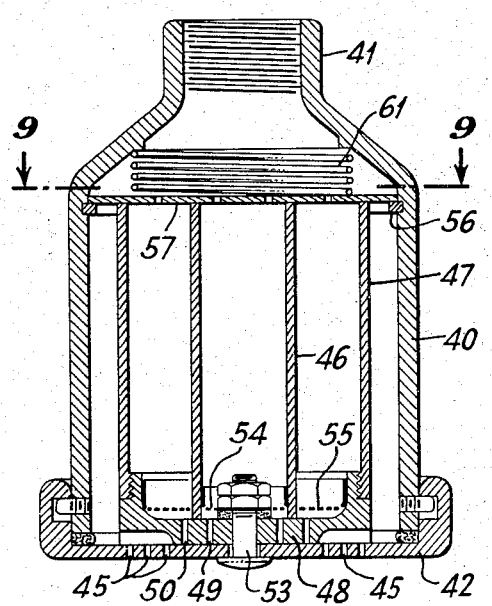
Figure 9:
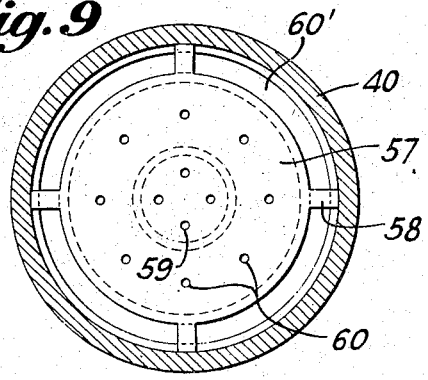
Figure 10:
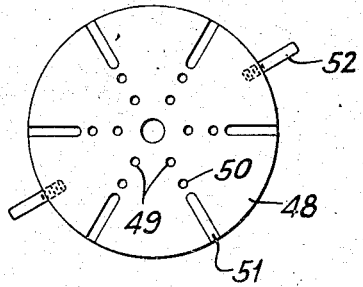
Figure 11:
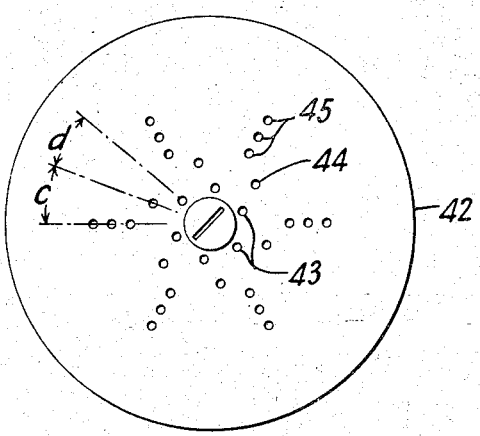

The novel features which I believe to be characteristic of my invention are set forth with particularity in the appended claims, but the invention itself will best be understood by reference to the following description taken in connection with the accompanying drawings in which Figure 1 is a longitudinal section of one form of liquid dispensing device made according to my invention, Figure 2 is a transverse section taken along line 2—2 of Figure 1, Figure 3 is a transverse section taken along line 3—3 of Figure 1, Figure 4 shows details of construction of an element of Figure 1, Figure 5 is a bottom view of Figure 1, Figure 6 is a partial section showing details of construction, Figure 7 is an end view of one form of cartridge used with my device, Figure 8 is a longitudinal section of a modification of the device made according to my invention, Figure 9 is a transverse section taken along the line 9—9 of Figure 8, Figure 10 shows details of construction of an element of Figure 8, Figure 11 is a bottom view of a device shown in Figure 8, Figure 12 is a view in perspective showing one form of mechanism for operating my device, Figure 13 is a section showing details of construction of the elements shown in Figure 12, Figure 14 is a longitudinal section of another form of my invention and Figures 15 and 16 show details of construction of elements used in Figure 14.

Referring to Figure 1, the liquid dispensing device comprises a tubular longitudinally extending casing or outer member 10 tapered at one end at 11 and provided with an internal threaded portion for engaging a liquid supply source. The open end of said tubular member 10 is closed by means of rotatable closure member 12 provided with a plurality of apertures 13 and 14 positioned along radially extending lines as best shown in Figure 5, the radial lines being at an angle $b$ to each other for purposes to be described. This closure member, as best shown in Figure 6, is provided on the inner surface of the lip with a groove or recess 15 which cooperates with the pins 16 secured to the outer surface of the tubular member 10 to support the cup-shaped member on said tubular member. It can be disengaged from the tubular member by pressing upwardly and rotating the member 12 so that the pin 16 registers with the vertical portion 15' of the slot 15 to permit disengagement. A gasket member 17 of compressible material may be used between cup-shaped member 12 and the end of tubular member 10 to prevent leakage.

An inner tubular member 18 is mounted within and coaxially of the outer tubular member 10 and has at its lower end the closure member 19 to which it may be threadably engaged, and which is formed with the apertures or passageways 20 extending through the closure member and communicating with the mixing chamber inside the inner tubular member. Radially extending grooves 21 are provided in the bottom surface of the closure member 19. These radially extending grooves communicate with the space between the inner tubular member 18 and the outer tubular member 10. In the position indicated in Figure 1 the apertures 13 in the cup-shaped member 12 and the radially extending grooves 21 register with each other so that there is direct communication between the exterior of the device and the space between the outer and inner tubular members. If rotated through the angle $b$ as shown in Figure 5, the apertures 13 are closed against the bottom surface of the member 19 and the apertures 20 in the closure member of the inner tubular member, and the apertures 14 of the rotatable cup-shaped member register to provide direct communication to the chamber within the inner tubular member 18. The rotatable cup-shaped member is rotated between these two positions for purposes to be described later.

The closure member 19 and cup-shaped member 12 are bolted together by means of the nut and bolt arrangement 22, but not tightly enough to prevent relative rotation. To prevent rotation of the inner closure member 19 and inner tubular member 18 when the cup-shaped member is rotated, pins 23 are provided secured to the closure member 19 and engaging the longitudinal slots 24 in the inside surface of tubular member 10, as best shown in Figure 6. A screen 25 may be provided in the bottom of the chamber for preventing particles of the material to be mixed from closing the apertures 20. Mounted in the upper end of the casing or outer tubular member 10 is a supporting ring 26, which may be contractable to permit removal by providing a gap through the ring. This ring supports a disc-shaped member 27 which closes the upper end of the inner tubular member 18. This disc-shaped member 27 serves to prevent mixtures from the mixing chamber from mixing with clear liquid flowing around the inner tubular member when my device is adjusted to deliver an unmixed liquid. Disc-shaped member 27 is provided with apertures 28 communicating with the chamber within the tubular member 18 and is supported on the ring by means of extensions 29 so that passageways 30 are provided in this member 27 communicating with the space between the inner and outer tubular members 10 and 18. The disc 27 is biased against a support 26 by means of spring 31. The passageways 30 would be replaced by apertures such as 28.

In the position shown in Figure 1 a liquid supplied through the threaded portion 11 will pass down through the passageways 30 between the inner and outer tubular members, inwardly through the radial grooves 21 through apertures 13 for providing a clear liquid which is unmixed with any active ingredients. As the cup-shaped member 12 is rotated so that apertures 13 are closed and apertures 14 and 20 register, the liquid will be supplied through the apertures 28 in member 27 to pass down over and through the cartridge 32 which may be of soap or like material provided with longitudinal openings or passages 33, which openings increase the mixing action and efficiency mixing action of the liquid to be mixed. The mixture then passes through the screen 25 and the apertures 20 and 14 to the exterior. It is noted that the number of apertures is limited to provide a small concentrated flow of the mixture.

A modification of the cartridge is shown in Figure 7 where the cartridge 35 is provided with rectangular shaped longitudinal openings 36 instead of round openings as shown in Figure 1.

In Figure 8 is shown a modification of the device shown in Figure 2. The outer tubular member or casing 40 is provided with threaded portion 41 for engagement with liquid supply source and is also provided with a rotatable cup-shaped member 42 rotatable with respect to the casing and supported in a manner similar to that shown in Figure 1. This closure member is in this case provided with three groups of apertures 43, 44 and 45 positioned along in different radial lines separated by angles $c$ and $d$ as shown in Figure 11 showing the bottom view of the cup-shaped closure member 42. In this modification two chambers are provided within the casing for active materials. The first inner tubular member 46 is surrounded by a second tubular member 47 so as to provide a circular chamber around the inner tubular member. This member 47 is secured to the closure member 48 by a screw threaded arrangement as shown, the closure member 48 being provided with apertures 49 and 50 and radially extending grooves 51 as best shown in Figure 10. The pins 52 engaged in grooves in the outer tubular member 40 prevent rotation of this member and tubular members 46 and 47. Apertures 49 and 50 communicate respectively with the chamber within the tubular member 46 and the chamber between the tubular members 46 and 47, the radially extending grooves 51 again communicating with the space between the outer tubular member 40 and tubular member 47. The closure members 42 and 48 are bolted together so as to permit relative relation however by means of the nut and bolt arrangement 53, screens 54 and 55 being provided at the bottom of the chambers to prevent particles of the active ingredients from blocking the apertures. Mounted on the supporting ring 56 at the top of the tubular member 40 is a disc shaped plate member 57, best shown in Figure 9, and provided with apertures 59 and 60 communicating with the chambers within tubular member 46 and between tubular members 46 and 47 and having radial extensions 58 resting on ring 56 providing passageways 60' communicating with the space between the tubular members 40 and 47. Biasing spring 61 maintains the disc 57 against the supporting ring 56. In the position shown, apertures 45 are in communication with the radial passageways 51 so that a passage is afforded for the liquid from the liquid supply source through passageway 60' to the space between tubular members 40 and 47, radial passageways 51 and apertures 45. Rotating the closure member 42 through an angle c, see Figure 11, apertures 44 are made to register with apertures 50 so that communication is provided with the chamber between tubular members 46 and 47. Liquid can then flow through the apertures 60 in disc 57, through the chamber between tubular members 46 and 47, apertures 50 and apertures 44 to the exterior of the device, thus providing a mixture with the active ingredients in the chamber between tubular members 46 and 47. Rotating closure member 42 through a further angle d, apertures 49 and 43 are registered to provide a communication to the chamber within the tubular member 46 so that liquid is directed through this chamber to provide a mixture supply to the exterior of the dispensing device. In this arrangement, therefore, it is possible to selectively obtain one of two different mixtures or a copious flow of clear liquid.

In Figure 12 is shown one means of operating the device made according to my invention. The dispensing device 10 is secured by means of the screw portion 11 to the source of liquid supply 9, the rotatable closure member 12 is provided with a groove or depression 12' which receives the end of the spring arm 62 secured to the lever mechanism 63 pivoted at 64, as best shown in Figure 13, so that it can be operated by chains 63' to rotate the closure member 12. Stops 66 may be provided for limiting the movement. To disengage the closure member 12' the spring arm 62 may be moved out of the groove to permit the necessary rotation of closure member 12 for disengaging it from the outer tubular member 10.

A still further modification of my invention is shown in Figure 14. In the arrangement shown, the outer tubular member 70 is provided with screw portion 71 and closure member 72, rotatably mounted in a manner similar to the other two modifications. It is provided with apertures 73 and 74 and supports the inner tubular member 75 which rotates with the closure member 72, it being screwed to this member as shown. A screw 76 holds screen 77 in place to prevent particles of active ingredients in the chamber 75 from clogging aperture 74. A supporting ring 78 supports a disc member 79 provided with apertures 80 and 81 as best shown in Figure 16, the disc being positively engaged to rotate with tubular member 75 and cup-shaped member 72 by receiving within the slots 82 the extensions 83 on the tubular member 75. Mounted above the disc-shaped member 79 is the disc-shaped member 84 provided with apertures 87 and 88, the slots 86 receiving pins 85 which prevent rotation of this disc when disc 79 is rotated. Spring 89 biases this member against the disc 79. In the position shown apertures 88 and 80 register to provide a communication to the space between the outer tubular member 70 and inner tubular member 75 so that the liquid can pass through this space to the exterior of the device through apertures 73 to provide a clear liquid. If tubular member 75 and disc 79 are rotated through angle e as shown in Figure 16, apertures 81 and 87 will register to provide communication with the chamber within the tubular member 75, the apertures 80 and 88 being closed in this position. A passage is then provided through the mixing chamber containing active ingredients to the exterior of the device through apertures 74.

It is possible to use a colored active ingredient so that the mixture will be colored, so that the lack of color will show when the active ingredient is exhausted.

With this arrangement in connection with showers water is prevented from being wasted, since water is used only when it is desired for rinsing purposes, or for removing the soapy solution or mixture, and not in large quantities during the soaping operation.

The active ingredients may be supplied as a cartridge so shaped that it will be closely fitted into the mixing chamber. However, active ingredients in the form of flakes, balls or chips of any size or shape may also be used. In connection with the soap, it is preferable to use one containing a certain amount of water and certain soluble inorganic salts, such as tetra-sodium-pyrophosphate or borax to insure rapid solubility of the soap and to increase the cleaning power of the resulting solution. The soap may be colored so as to produce a slightly colored solution, thereby indicating when the cake of soap is used up and the chamber needs refilling.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A liquid discharging device provided with an outer tubular member formed at one end for attachment to a liquid supplying source, the other end of said tubular member being open, a closure member for said other end of the tubular member and provided with a plurality of apertures and rotatable with respect to said outer tubular member, an inner tubular member having a chamber for receiving active material to be mixed with the liquid, a closure member for said inner tubular member overlying said first mentioned closure member and provided with a plurality of passageways some of which communicate with the chamber of the inner tubular member and others with the space between said inner tubular member and said outer tubular member, said closure members having relative rotation and said apertures and passageways in said members being arranged in angularly displaced groups whereby in one position of the rotation of the members a group of passageways communicating with the chamber register with the corresponding group of apertures to provide communication from the chamber to the outside of said outer tubular member to provide a passage from the liquid supplying source through the chamber to the exterior of the casing to provide a flow of the mixture, or whereby in another position the apertures and passageways of the other group register to provide a passage for the unmixed liquid between the outer and inner tubular members to provide a copious flow of the unmixed liquid.

2. A liquid discharging device provided with an outer tubular member formed at one end for attachment to a liquid supplying source, the other end of said tubular member being open, a closure member for the open end and rotatable with respect to said outer tubular member and being provided with a plurality of sets of apertures positioned along radial lines, an inner tubular member for receiving active material to be mixed with the liquid, a closure member for said inner tubular member lying in contact with said first named enclosure member and provided with apertures which communicate with the interior of the inner tubular member and radially extending grooves communicating with the space between said inner tubular member and said outer tubular member, the rotatable closure member when rotated to one position having some of its apertures arranged to register with the radially extending grooves communicating with the space between the inner and outer members and when rotated to another position having other apertures arranged to register with the apertures communicating with the interior of the inner tubular member.

3. A liquid discharging device provided with an outer tubular member formed at one end for attachment to a liquid supplying source, the other end of said tubular member being open, a closure member for the open end and provided with a plurality of apertures and rotatable with respect to said outer tubular member, an inner tubular member having a chamber for receiving active material to be mixed with the liquid, a closure member adjacent said first mentioned closure member for said inner tubular member provided with a plurality of passageways some of which communicate with the interior of the inner tubular member and others with the space between said inner tubular member and said outer tubular member, an apertured disc closing the top of said chamber and having passageways communicating with the inner tubular member and the space between the outer and inner tubular members, a support for said disc and resilient means for urging said disc against said support to maintain said disc in position, said closure members having relative rotation, and said apertures and passageways in said closure members being arranged in angularly displaced groups whereby in one position of rotation of said members the group of passageways communicating with the chamber registers with the corresponding group of apertures to provide communication from the chamber to the outside of said outer tubular member to provide a passage from the supply means through the inner chamber to the exterior of the outer tubular member to provide a flow of the mixture, and in another position the apertures and passageways of the other group register for providing a passage for the liquid between the outer and inner tubular members to provide a copious flow of the clear liquid.

4. A liquid discharging device adapted to be connected to a liquid supplying source and having an outer tubular member and a rotatable closure member provided with a plurality of apertures positioned along radially extending lines at different angular positions, a first inner tubular member concentric with the outer tubular member providing a chamber and a second inner tubular member concentric with the first inner tubular member providing a second chamber, said chambers being adapted to receive different active materials, a member closing the ends of said inner tubular members adjacent the closure member of the outer tubular member and having passageways extending therethrough and communicating with the chambers of said tubular members, and other passageways therein and communicating with the space between the outer tubular member and the inner tubular members, said apertures and passageways being arranged in angularly displaced groups said rotatable closure member for the outer tubular member being rotatable through different angles to selectively register the apertures in said rotatable closure member with the passageways in the closure member for the inner tubular members to selectively provide a flow of different mixtures or a clear liquid.

5. A liquid discharging device adapted to be connected to a source of liquid supply and having an outer tubular member and a rotatable closure member for one end of said tubular member said closure member being provided with a plurality of apertures positioned along radially extending lines at different angular positions, a first inner tubular member providing a chamber, and a second inner tubular member surrounding said first tubular member for providing a second chamber said tubular members being concentric around said first chamber, said chambers being adapted to receive active ingredients, a member closing the ends of said inner tubular members adjacent the closure member of the outer tubular member and having passageways extending therethrough communicating with the chambers of said tubular members, and other passageways therein adjacent said rotatable closure member and extending radially for communicating with the space between the outer tubular member and the inner tubular members, said apertures and passageways being arranged in angularly displaced groups said rotatable closure member for the outer casing being rotatable through different angles to selectively register the apertures in said rotatable closure member with the passageways in the closure member for the inner tubular members to selectively provide a plurality of separate mixtures or a clear fluid, and screens in said chambers for screening the apertures communicating with said chambers to prevent particles of the active ingredients from clogging said apertures.

6. A liquid discharging device including an outer tubular member and a rotatable closure member provided with a plurality of apertures, an inner tubular member providing a chamber supported on and fixed at one end to said rotatable closure member, some of said apertures communicating with said chamber and others with the space between the tubular members, a member closing the other end of said inner tubular member and having apertures extending through said last closure member into the chamber at the inner member and communicating with the space between the outer tubular member and the inner tubular member and rotatable with said inner tubular member, fixed means adjacent said last closure member provided with apertures some of which register with the apertures in said last closure member communicating with the chamber when said rotatable closure member is in one position, and the others of which register with the apertures communicating with the space between said tubular members when said rotatable closure member is rotated to another position.

7. A liquid discharging device including a tubular casing formed at one end for attachment to a liquid supply and having an opening at the other end, a tubular member inside said casing and provided on its interior with a chamber for receiving active material to be mixed with the liquid, a closure member engaging the open end of said casing and provided with a plurality of apertures, and means adjacent the closure member and engaging the tubular member and provided with a plurality of sets of passageways, one set communicating with the chamber of the inner tubular member and another set communicating with the space between the inner tubular member and said casing, said apertures and passageways in said closure member and means engaging said tubular member being arranged in angularly displaced groups whereby in one position of rotation of the closure member and means the group of passageways communicating with the chamber register with the corresponding group of apertures to provide communication from the chamber to the outside of said tubular casing to provide a passageway from the liquid supply source through the chamber to the exterior of the casing to provide a flow of the mixture, or whereby in another position the apertures and passageways of the other group register to provide a passageway for the unmixed liquid between the tubular member and casing to provide a flow of the unmixed liquid.

8. A liquid discharging device including a tubular casing formed at one end for attachment to a liquid supply and having an opening at the other end, a tubular member inside said casing and provided on its interior with a chamber for receiving active material to be mixed with the liquid, a closure member engaging the open end of said casing and provided with a plurality of apertures, and means adjacent the closure member and engaging the tubular member and provided with a plurality of sets of passageways, one set communicating with the chamber of the inner tubular member and another set communicating with the space between the inner tubular member and said casing, said apertures and passageways in said closure member and means engaging said tubular member being arranged in angularly displaced groups whereby in one position of rotation of the closure member and means the group of passageways communicating with the chamber register with the corresponding group of apertures to provide communication from the chamber to the outside of said tubular casing to provide a passageway from the liquid supply source through the chamber to the exterior of the casing to provide a flow of the mixture, or whereby in another position the apertures and passageways of the other group register to provide a passageway for the unmixed liquid between the tubular member and casing to provide a flow of the unmixed liquid, and a lever mechanism supported on the exterior of said casing and operatively associated with the apertured closure member for rotating said apertured closure member.

9. A liquid discharging device including a tubular casing formed at one end for attachment to a liquid supply and having an opening at the other end, a tubular member inside said casing and provided on its interior with a chamber for receiving active material to be mixed with the liquid, a closure member having a plurality of apertures engaging the open end of said casing and means engaging said tubular member and provided with a plurality of sets of passageways, one set communicating with the chamber in the inner tubular member, and another set communicating with the space between the inner tubular member and said casing, said apertures and said passageways being angularly displaced, said apertured member and said means having relative rotation for selectively positioning the passageways and apertures, whereby in one position a flow of liquid from the liquid supply will pass through the chamber of the inner tubular member, and in another position through the space between the inner tubular member and the outer casing.

10. A liquid discharging device adapted to be connected to a source of liquid supply and having an outer tubular member and a rotatable closure member at one end of said tubular member, said closure member being provided with a plurality of groups of apertures angularly displaced, a first inner tubular member within said outer tubular member providing a chamber and a second tubular member surrounding said first inner tubular member for providing a second chamber around said first member, said tubular members being concentric, said chambers being adapted to receive active ingredients, a member closing the ends of said inner tubular members adjacent the closure member of the outer tubular member and having passageways extending therethrough communicating with the chambers of said inner tubular members, and other passageways therein adjacent said rotatable closure member and extending radially for communicating with the space between the outer tubular member and the inner tubular members, said passageways and apertures being angularly displaced in groups, said rotatable closure member for the outer tubular member being rotatable through different angles to successively register the apertures in said rotatable closure member with the corresponding passageways in the closure member for the inner tubular members, screens in said chambers for screening the apertures communicating with said chambers to prevent particles of the active ingredients from clogging said apertures.

11. A liquid discharging device including a tubular casing formed at one end for attachment to a liquid supply and having an opening at the other end, a tubular member inside said casing and provided on its interior with a chamber for receiving active material, a closure member engaging the open end of said casing and having a plurality of sets of apertures, each set angularly displaced with respect to the other, and a closure member engaging said tubular member and provided with a plurality of sets of passageways, one set communicating with the chamber of the inside tubular member and another set with the space between the tubular member and casing, said apertures and said passageways being arranged in angularly displaced groups, whereby in one position of rotation of said closure members, one position of rotation of said closure members, the groups of passageways communicating with the chamber register with the corresponding group of apertures to provide communication from the chamber of the inner tubular member to the exterior of the casing, and in another position the passageways and apertures of the other group register to provide communication from the space between the inner tubular member and casing to the exterior of said device.

HENRY WENKER.